(12) United States Patent
Fujiwara et al.

(10) Patent No.: US 11,196,326 B2
(45) Date of Patent: Dec. 7, 2021

(54) MANUFACTURING METHOD FOR ELECTRIC MOTOR STATOR

(71) Applicants: TOYOTA JIDOSHA KABUSHIKI KAISHA, Toyota (JP); DENSO CORPORATION, Kariya (JP)

(72) Inventors: Shimpei Fujiwara, Miyoshi (JP); Masashi Kawai, Nisshin (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 331 days.

(21) Appl. No.: 16/180,510

(22) Filed: Nov. 5, 2018

(65) Prior Publication Data
US 2019/0173365 A1 Jun. 6, 2019

(30) Foreign Application Priority Data
Dec. 5, 2017 (JP) .............................. JP2017-233658

(51) Int. Cl.
| | |
|---|---|
| *H02K 15/12* | (2006.01) |
| *H02K 3/34* | (2006.01) |
| *H02K 15/10* | (2006.01) |
| *B29C 35/02* | (2006.01) |
| *B29C 41/20* | (2006.01) |

(Continued)

(52) U.S. Cl.
CPC ............. *H02K 15/12* (2013.01); *B29C 35/02* (2013.01); *B29C 41/20* (2013.01); *H02K 3/34* (2013.01); *H02K 15/105* (2013.01); *B29K 2063/00* (2013.01); *B29K 2067/06* (2013.01); *B29K 2905/12* (2013.01); *B29L 2031/7498* (2013.01)

(58) Field of Classification Search
CPC ........ H02K 15/12; H02K 3/34; H02K 15/105; B29C 35/02; B29C 41/20; B29C 45/14639; B29L 2031/7498; B29K 2067/06; B29K 2905/12; B29K 2063/00
See application file for complete search history.

(56) References Cited

U.S. PATENT DOCUMENTS

| | | | | |
|---|---|---|---|---|
| 4,252,513 | A | * 2/1981 | Kalnins | ................. B29C 70/882 425/126.1 |
| 5,656,231 | A | * 8/1997 | Blackmore | ......... E04G 23/0225 264/408 |

(Continued)

FOREIGN PATENT DOCUMENTS

| | | |
|---|---|---|
| JP | 6-182780 A | 7/1994 |
| JP | 2004-048957 A | 2/2004 |

(Continued)

*Primary Examiner* — Nahida Sultana
(74) *Attorney, Agent, or Firm* — Sughrue Mion, PLLC

(57) ABSTRACT

A manufacturing method for an electric motor stator includes an injecting step in which thermosetting resin is injected into a forming die, a dipping step in which a coil end portion is dipped into the thermosetting resin injected into the forming die, a heating step in which the thermosetting resin inside the forming die is heated so as to form a molded portion, and a mold release step in which the molded portion is released from the forming die when at least either shear force of the thermosetting resin or adhesive strength between the coil end portion and the thermosetting resin becomes greater than previously-determined mold release force.

5 Claims, 4 Drawing Sheets

(51) Int. Cl.
  B29L 31/00  (2006.01)
  B29K 67/00  (2006.01)
  B29K 63/00  (2006.01)

(56)  References Cited

U.S. PATENT DOCUMENTS

| | | | | |
|---|---|---|---|---|
| 2007/0236099 A1* | 10/2007 | Kim | ................. | H02K 1/30 |
| | | | | 310/266 |
| 2009/0291161 A1* | 11/2009 | Kayano | ................. | B29C 45/73 |
| | | | | 425/552 |
| 2010/0019588 A1* | 1/2010 | Makino | ................. | H02K 15/12 |
| | | | | 310/52 |
| 2014/0287927 A1* | 9/2014 | Swaffield | ............ | B29C 39/003 |
| | | | | 505/211 |

FOREIGN PATENT DOCUMENTS

| | | |
|---|---|---|
| JP | 2012-165484 A | 8/2012 |
| JP | 2016-046832 A | 4/2016 |
| JP | 2017-189058 A | 10/2017 |

* cited by examiner

MANUFACTURING METHOD FOR ELECTRIC MOTOR STATOR

INCORPORATION BY REFERENCE

The disclosure of Japanese Patent Application No. 2017-233658 filed on Dec. 5, 2017 including the specification, drawings and abstract is incorporated herein by reference in its entirety.

BACKGROUND

1. Technical Field

The disclosure relates to a manufacturing method for an electric motor stator in which a molded portion is formed. The molded portion is made from thermosetting resin and covers a coil end portion of a stator coil wound around a stator core.

2. Description of Related Art

As a manufacturing method for an electric motor stator, there is a known method. In this method, a regulating member is disposed between a periphery of a coil end portion and a case, and sheet-shaped thermosetting resin is disposed between the coil end portion and the case. The sheet-shaped thermosetting resin is heated and cured by the coil end portion and the case while being compressed by the coil end portion and the case, and then the regulating member is removed (for example, Japanese Unexamined Patent Application Publication No. 2016-46832 (JP 2016-46832 A)). In the method, the thermosetting resin is compressed while being regulated by the regulating member so that the thermosetting resin does not escape outside. Thus, it is possible to insulate welded portions of coil wires or the like in the coil end portion in a favorable manner while restraining generation of a hollow inside a molded portion that is made from the thermosetting resin and formed between the coil end portion and the case.

SUMMARY

However, when the regulating member is disposed in the periphery of the thermosetting resin in order to form the molded portion as described above, heat is not easily transferred to the thermosetting resin. Therefore, it takes time to cure the thermosetting resin, and addition of steps for installing and removing the regulating member, and so on also cause an increase in manufacturing cost for an electric motor stator. Meanwhile, when a forming die is used to form the molded portion that covers the coil end portion, it is not necessary to use the regulating member. However, in an attempt to heat and cure the molded portion inside the forming die, it is necessary to prepare a number of the forming dies, and a facility such as a soaking furnace for heating the integrated forming dies that hold stator cores and the molded portions. This makes it difficult to reduce manufacturing cost.

Therefore, the disclosure reduces manufacturing cost for an electric motor stator that includes a molded portion that is made from thermosetting resin and covers a coil end portion of a stator coil.

An aspect of the disclosure is a manufacturing method for an electric motor stator. The electric motor stator includes a molded portion that is made from thermosetting resin and covers a coil end portion of a stator coil wound around the stator core. The manufacturing method includes an injecting step in which the thermosetting resin is injected into a forming die, a dipping step in which the coil end portion is dipped into the thermosetting resin that is injected into the forming die, a heating step in which the thermosetting resin inside the forming die is heated so as to form the molded portion, and a mold release step in which the molded portion is released from the forming die when at least either shear force of the thermosetting resin or adhesive strength between the coil end portion and the thermosetting resin becomes greater than previously-determined mold release force.

In the manufacturing method, the coil end portion is dipped into the thermosetting resin injected into the forming die, and the thermosetting resin inside the forming die is heated, thus forming the molded portion. Then, in this method, the molded portion is released from the forming die when at least either the shear force of the thermosetting resin or the adhesive strength between the coil end portion and the thermosetting resin becomes greater than the previously-determined mold release force. Therefore, even if the thermosetting resin is not completely cured inside the forming die after forming of the molded portion starts, it is possible to release the molded portion from the forming die while restraining breakage of the uncured thermosetting resin due to shear, or separation of the coil end portion and the thermosetting resin from each other, as long as the shear force of the thermosetting resin or the adhesive strength between the coil end portion and the thermosetting resin is greater than the mold release force. Thus, after forming the molded portion starts, the molded portion can be released from the forming die at an early stage, and the thermosetting resin is cured completely by remaining heat. Therefore, it is not necessary to prepare a number of the forming dies and a facility for heating the integrated forming dies that hold the stator cores and the molded portions. Hence, in the method, it is possible to reduce manufacturing cost for the electric motor stator including the molded portion that is made of the thermosetting resin and covers the coil end portion of the stator coil.

In the manufacturing method, the heating step may be a step in which the thermosetting resin inside the forming die is heated by applying an electric current to the stator coil. The mold release step may be a step in which the molded portion is released from the forming die when the shear force of the thermosetting resin becomes greater than the mold release force. With the configuration, when thermosetting resin inside the forming die is heated by applying an electric current to the stator coil, the thermosetting resin that are not in contact with the coil end portion is cured later than the thermosetting resin in the periphery of the coil end portion. Therefore, when the thermosetting resin is heated by applying an electric current to the stator coil, the molded portion is released from the forming die when the shear force of the thermosetting resin becomes greater than the mold release force, and it is thus possible to favorably restrain the thermosetting resin away from the coil end portion from breaking due to shear associated with the mold release.

In the manufacturing method, the mold release step may be a step in which the molded portion is released from the forming die when heating time of the thermosetting resin elapses after start of heating of the thermosetting resin. The heating time may be previously determined based on a curing extent of the thermosetting resin when the shear force becomes greater than the mold release force, and heating temperature of the thermosetting resin. With the configuration, it is possible to release the molded portion from the forming die at an early stage while favorably restraining the thermosetting resin away from the coil end portion from breaking due to shear associated with the mold release.

In the manufacturing method, the heating step may be a step in which the thermosetting resin is heated by applying heat to the forming die. The mold release step may be a step in which the molded portion is released from the forming die when the adhesive strength between the coil end portion and the thermosetting resin becomes greater than the mold release force. With the configuration, when thermosetting resin is heated by applying heat to the forming die, the thermosetting resin in the periphery of the coil end portion away from the forming die is cured later than the thermosetting resin that is in contact with the forming die. Therefore, when the thermosetting resin is heated by applying heat to the forming die, the molded portion is released from the forming die when the adhesive strength between the coil end portion and the thermosetting resin becomes greater than the mold release force. Thus, it is possible to favorably restrain separation of the coil end portion and the thermosetting resin from each other as the coil end portion is released from the thermosetting resin.

In the manufacturing method, the mold release step may be a step in which the molded portion is released from the forming die when heating time of the thermosetting resin elapses after start of heating of the thermosetting resin. The heating time previously determined based on a curing extent of the thermosetting resin when the adhesive strength becomes greater than the mold release force, and heating temperature of the thermosetting resin. With the configuration, it is possible to release the molded portion from the forming die at an early stage while favorably restraining separation of the coil end portion and the thermosetting resin from each other due to the mold release.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, an embodiment for carrying out the disclosed disclosure is described with reference to the drawings.

Figure 1:
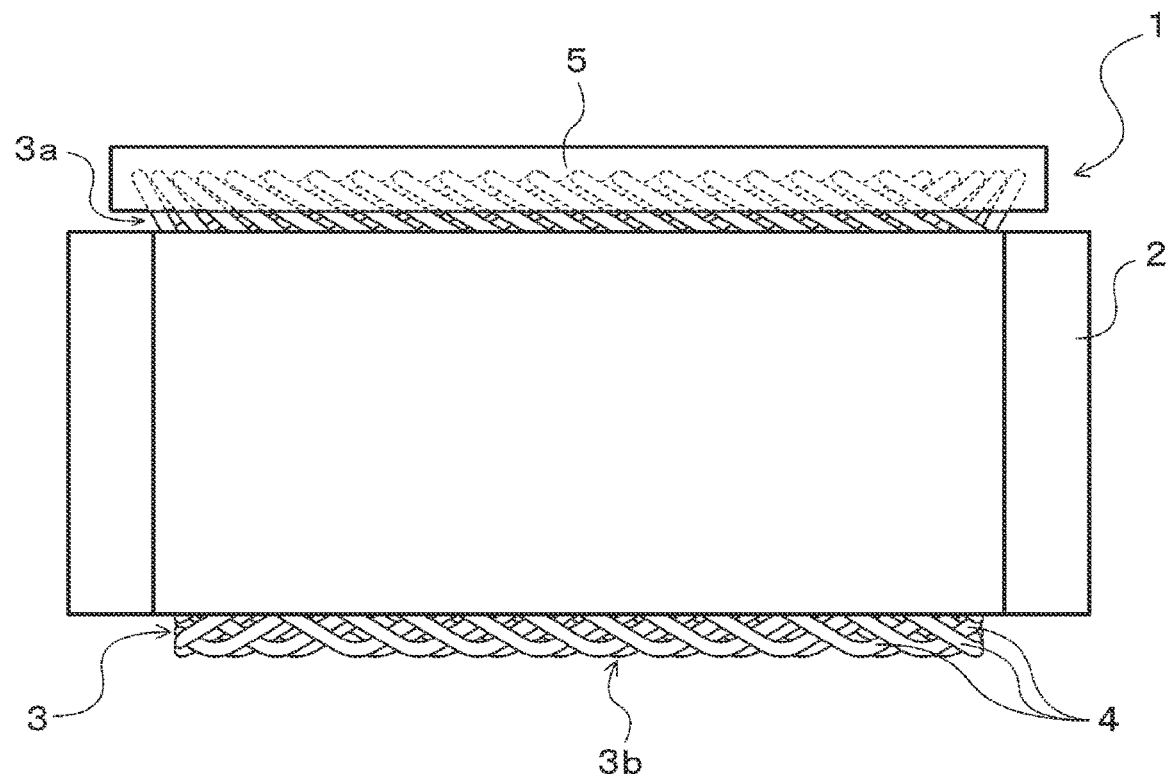
FIG. 1 is a schematic diagram of an electric motor stator manufactured in a method according to the disclosure.

FIG. 1 is a schematic diagram of an electric motor stator 1 manufactured in a method according to the disclosure. The electric motor stator 1 shown in the drawing structures a three-phase alternating current electric motor together with a rotor (not shown). The electric motor is used as, for example, a traveling driving source or a generator for an electric vehicle or a hybrid vehicle. The electric motor stator 1 according to the embodiment includes a stator core 2, and a plurality of stator coils 3.

The stator core 2 is structured by laminating a plurality of electromagnetic steel sheets that is formed into a circular shape by, for example, press working, and the stator core 2 has a circular shape as a whole. The stator core 2 includes a plurality of teeth (not shown) and a plurality of core slots (not shown). The teeth project radially inwardly from an annular outer peripheral portion of the stator core 2 at intervals in a circumferential direction. Each of the core slots is formed between the teeth that are next to each other. The stator core 2 may be formed integrally by, for example, pressing and sintering ferromagnetic powder at the same time.

The stator coils 3 include an U-phase coil, a V-phase coil, and a W-phase coil, and each of the stator coils 3 is formed by electrically connecting a plurality of segment coils 4. Each of the segment coils 4 is an almost U-shaped electric conductor having an insulating film made from, for example, enamel resin on its surface, and has two free end portions in which the insulating film is removed. The two free end portions of each of the segment coils 4 are inserted in the corresponding core slots of the stator core 2, respectively. Also, a portion of each of the segment coils 4 projecting from one end surface (an upper end surface in FIG. 1) of the stator core 2 is bent by using a bending apparatus (not shown). Further, the free end portions of each of the segment coils 4 are electrically joined (welded) to corresponding free end portions of other segment coil.

Thus, the stator coils 3 are wound around the stator core 2, and each of the stator coils 3 has two annular coil end portions 3a, 3b projecting outwardly from end surfaces of the stator core 2 in the an axis direction, respectively. The coil end portion 3a on an upper end surface side of the stator core 2 in the drawing includes a number of joined portions between the free end portions of the segment coils 4, and exposed portions of the electric conductors. On the contrary, the coil end portion 3b on a lower end surface side of the stator core 2 in the drawing does not include the joined portions between the free end portions of the segment coils 4 and the exposed portions of the electric conductors.

Further, the electric motor stator 1 includes a molded portion 5 that covers the coil end portion 3a of each of the stator coils 3 on the upper end surface side in the drawing. The molded portion 5 is made from thermosetting resin (epoxy resin in the embodiment) that is formed by the use of a forming die into an annular shape so as to cover the coil end portions 3a. Thus, as the thermosetting resin enters a gap between the neighboring segment coils 4, the joined portions between the free end portions of the segment coils 4, and the exposed portions of the electric conductors are insulated in a favorable fashion. Although not shown, the electric motor stator 1 may be provided with a molded portion that covers the coil end portions 3b on the lower end surface side of the stator core 2 in the drawing. The thermosetting resin may be, for example, unsaturated polyester, other than epoxy resin.

Figure 2:
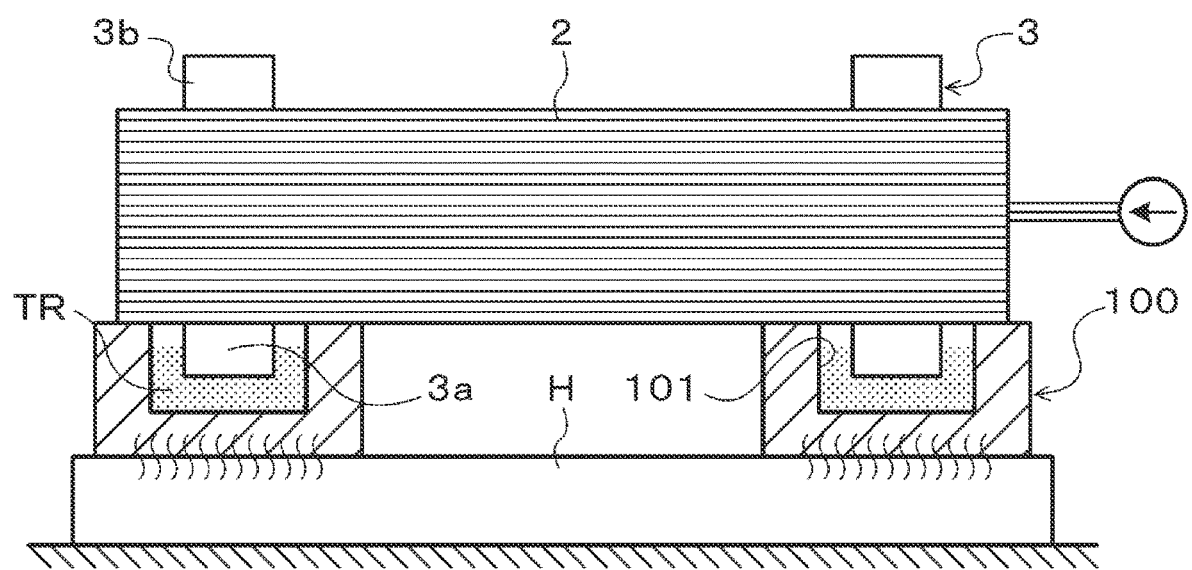
FIG. 2 is a schematic view describing manufacturing steps for the electric motor stator shown in FIG. 1.

FIG. 2 is a schematic view describing steps for forming the molded portion 5 of the electric motor stator 1. To form the molded portion 5, first of all, the stator core 2 is set in a workpiece moving mechanism (not shown), and, at the same time, thermosetting resin TR in a liquid state is injected into a forming die 100 that is made from metal (a steel material) and mounted on a heater H (for example, an IH heater). The workpiece moving mechanism is disposed above the heater H and the forming die 100, and structured so as to position the stator core 2 close to the forming die 100, and also to apply mold release force Fr to the stator core 2 so that the stator core 2 is separated from the forming die 100. Further, the forming die 100 includes an annular recessed portion (a cavity) 101 defined by an inner surface that corresponds to an external shape of the molded portion 5, and the thermosetting resin TR in the liquid state is injected into the recessed portion 101.

After the thermosetting resin TR is injected into the forming die 100, the workpiece moving mechanism positions the stator core 2 with respect to the forming die 100 so that the coil end portions 3*a* are sufficiently dipped into the thermosetting resin TR inside the recessed portion 101. Also, a direct current power source is connected with each of the stator coils 3 wound around the stator core 2. Further, direct current is applied to each of the stator coils 3 from the direct current power source, and, at the same time, the heater H is activated so as to heat the forming die 100 from a lower surface side, and the thermosetting resin TR inside the recessed portion 101 is heated at predetermined heating temperature T (for example, 150° C.). Thus, the molded portion 5 is formed. Then, at a stage when predetermined heating time th has elapsed since start of heating, the workpiece moving mechanism applies the mold release force Fr to the stator core 2 to release the molded portion 5 from the forming die 100. Then, the electric motor stator 1 in which the molded portion 5 is formed is conveyed to a storage space. While the electric motor stator 1 is stored in the storage space, the thermosetting resin TR of the molded portion 5 is completely cured by remaining heat and then cooled down to room temperature.

Figure 3:
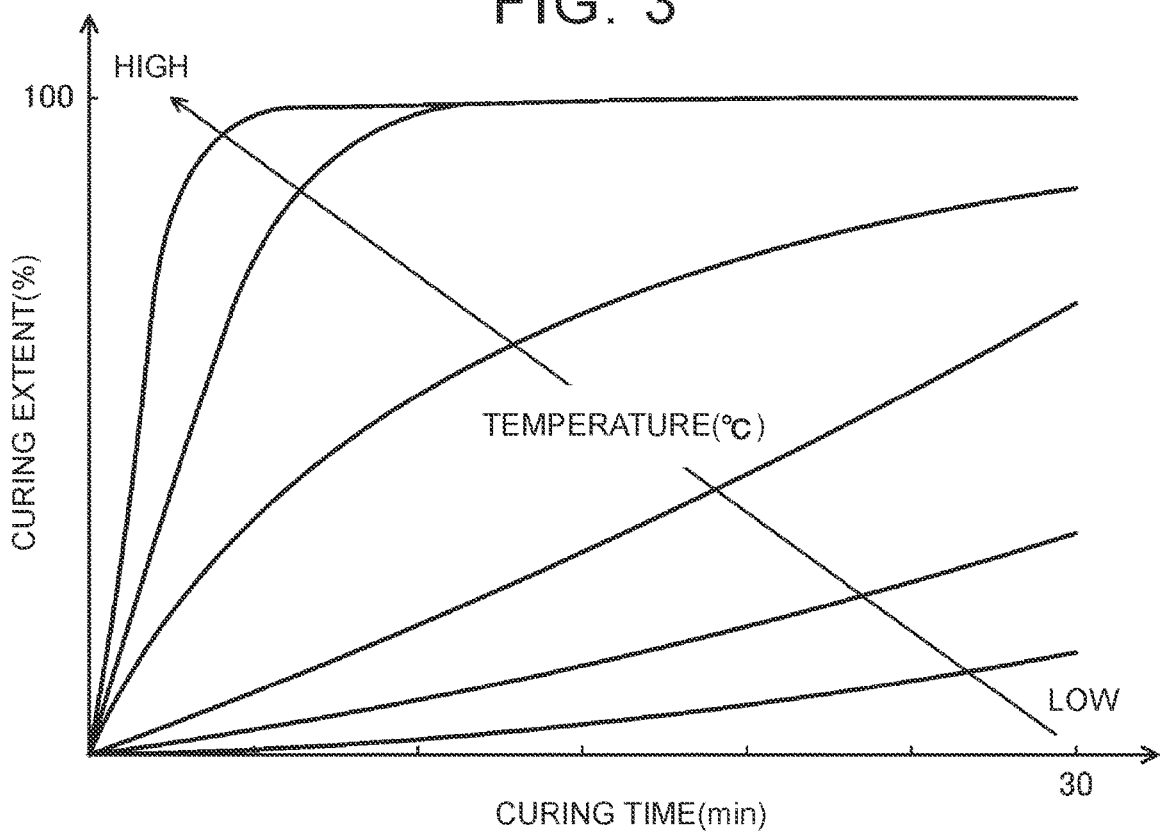
FIG. 3 is a graph showing characteristics of thermosetting resin from which a molded portion of the electric motor stator shown in FIG. 1 is formed.
Figure 4:
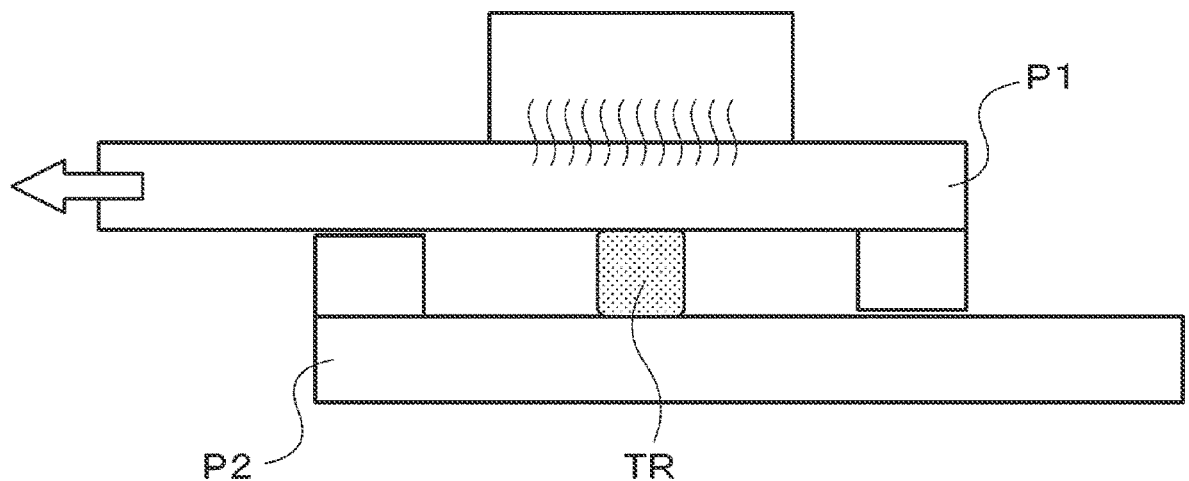
FIG. 4 is a schematic view describing steps of measuring shear force of the thermosetting resin.
Figure 5:
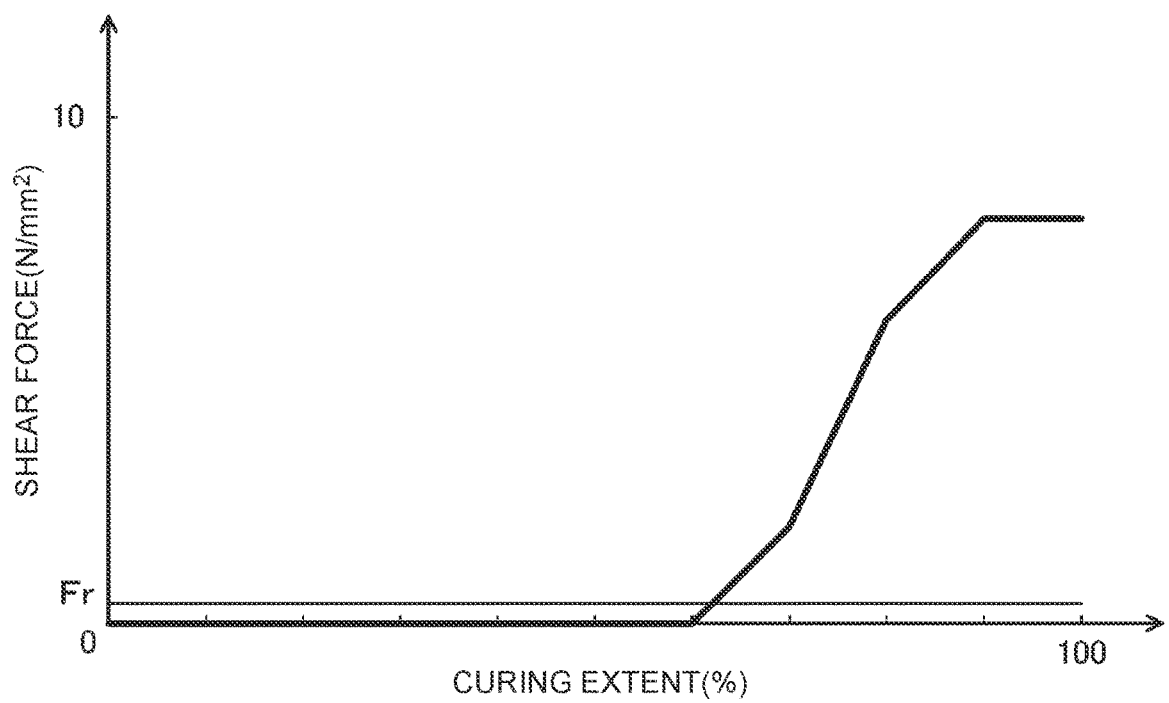
FIG. 5 is a graph showing a measurement result of the shear force of the thermosetting resin.

Next, described with reference to FIG. 3 to FIG. 5 are steps for setting the heating time th for the thermosetting resin TR when the molded portion 5 is formed.

To set the heating time th, first of all, a characteristic curve shown in FIG. 3 is prepared that shows a correlation among curing time (heating time), a curing extent (a curing rate), and heating temperature with regard to the thermosetting resin (epoxy resin) TR, and then cure kinetics of the thermosetting resin TR at each heating temperature is obtained from the characteristic curve. Usually, the characteristic curve of the thermosetting resin TR is provided by, for example, a resin manufacturer and the like. Next, based on the cure kinetics at each temperature, and temperature history of the thermosetting resin TR (temperature changes due to heat of reaction and so on) that is previously obtained from experiments and so on, heating time is derived at which the thermosetting resin TR reaches a targeted curing extent (between 10% and 100% at an interval of 10%) when the thermosetting resin TR is heated at given heating temperature T in a room temperature environment. Then, with the use of a testing device shown in FIG. 4, shear force of the thermosetting resin TR is measured with each of the curing extent in the interval of 10%.

The testing device shown in FIG. 4 includes two plates P1, P2 that are made from metal (iron) and extend in parallel to each other. For example, the plate P2 on a lower side of the drawing is fixed so as to be stationary. When the shear force of the thermosetting resin TR is measured, the thermosetting resin TR is disposed between the two plates P1, P2, and the plate P1 on an upper side in the drawing is heated by a heater (not shown) so that the thermosetting resin TR is heated at given temperature (for example, 150° C.). Further, at a point when heating time corresponding to a targeted curing extent has elapsed since start of the heating, force is applied to the plate P1 on the upper side in the drawing so as to separate the plate P1 from the other plate P2 in a state where the plate P1 remains in a parallel state. Then, force when the thermosetting resin TR is broken due to shear is measured as shear force of the thermosetting resin TR. FIG. 5 shows a measurement result of the shear force of the thermosetting resin TR at each curing extent.

As shown in FIG. 5, when the curing extent of the thermosetting resin TR is 60% or lower, the shear force that breaks the thermosetting resin TR is substantially zero. On the contrary, when the curing extent of the thermosetting resin TR reaches 70%, the shear force that breaks the thermosetting resin TR becomes sufficiently greater than the mold release force Fr (for example, about 0.1 N/mm²) that is applied to the stator core 2 (the molded portion 5) by the workpiece moving mechanism, as shown in the graph. Based on the measurement result, in the embodiment, the characteristic curve shown in FIG. 3 is used to obtain curing time when heating temperature becomes the heating temperature T and the curing extent becomes 70%, and the curing time is determined as the heating time th. Thus, the heating time th is shortened to about 20% (for example, about three minutes) of curing time obtained from the characteristic curve shown in FIG. 3 when the curing extent of the thermosetting resin TR is 100%. As described above, the heating time th becomes shorter than the curing time obtained when the curing extent of the thermosetting resin TR becomes 100%. Therefore, when the molded portion 5 is formed, even if the thermosetting resin TR is not completely cured inside the forming die 100, the mold release force Fr is applied to the stator core 2 and the molded portion 5 is released from the forming die 100 with the elapse of the heating time th.

Here, as described earlier, when an electric current is applied to the stator coils 3, and, at the same time, the heater H heats the forming die 100 in order to heat the thermosetting resin TR inside the recessed portion 101, curing of the thermosetting resin TR in the periphery of the coil end portion 3*a* and the periphery of the inner surface of the forming die 100 is promoted. On the other hand, the thermosetting resin TR that are separated from and are not in contact with the coil end portion 3*a* and the inner surface of the forming die 100 is cured later than the thermosetting resin TR in the periphery of the coil end portion 3*a* and the periphery of the inner surface of the forming die 100. However, as long as the shear force of the thermosetting resin TR (the shear force in the mold release direction) is greater than the mold release force Fr, the uncured thermosetting resin TR theoretically does not break due to shear even when the molded portion 5 is released from the forming die 100 with the mold release force Fr.

Therefore, at a point when the heating time th obtained as described above has elapsed since start of heating, the mold release force Fr is applied to the stator core 2, and the molded portion 5 is released from the forming die 100. Then, since the shear force of the thermosetting resin TR is sufficiently greater than the mold release force Fr, it is possible to restrain breakage of the thermosetting resin TR that is not in contact with the coil end portion 3*a* and the inner surface of the forming die 100 in an extremely favorable manner, the breakage being caused by shear associated with the mold release. Then, by making the heating time th shorter than the curing time when the curing extent of the thermosetting resin TR becomes 100%, it is possible to release the molded portion 5 from the forming die 100 at an early stage. Therefore, time required for forming the molded portion 5 can be shortened dramatically.

Further, by releasing the molded portion 5 from the forming die 100 at an early stage, the electric motor stator 1 is separated from the forming die 100 and the thermosetting resin TR is completely cured by remaining heat. Thus, it is not necessary to prepare a number of the forming dies 100 and a facility such as a soaking furnace for heating the integrated forming dies 100 that hold the stator cores 2 and the molded portions 5. As a result, it is possible to further reduce manufacturing cost for the electric motor stator 1 including the molded portion 5 that is made of the thermosetting resin TR and covers the coil end portions 3a of the stator coils 3.

Further, before the thermosetting resin TR inside the forming die 100 is completely cured, in other words, in a state the thermosetting resin TR is kept at high temperature, thermal contraction of the thermosetting resin TR does not happen, and biting of the thermosetting resin TR (the molded portion 5) into the forming die 100 due to a difference in linear expansion coefficient between the forming die 100 and the thermosetting resin TR is restrained. Therefore, as the molded portion 5 is released from the forming die 100 at an early stage at a point when the heating time th has elapsed since start of heating, it is possible to reduce the mold release force Fr compared to a case where the molded portion 5 is released from the forming die 100 after the thermosetting resin TR is completely cured.

Further, as described above, as the heating time th of the thermosetting resin TR is previously determined from the curing extent of the thermosetting resin TR when the shear force of the thermosetting resin TR is greater than the mold release force Fr, and the heating temperature T of the thermosetting resin TR, the heating time th becomes appropriate time that favorably restrains breakage of the uncured thermosetting resin TR, the breakage caused by shear. Further, it is possible to make the heating time th even shorter by more precisely specifying the curing extent of the thermosetting resin TR when the shear force of the thermosetting resin TR is greater than the previously-determined mold release force Fr, and heating time corresponding to the curing extent, based on further experiments and analysis.

When the molded portion 5 of the electric motor stator 1 is formed, heating of the forming die 100 by the heater H may be omitted. Also, when the molded portion 5 is formed, heating of the thermosetting resin TR that is carried out by applying a direct current to each of the stator coils 3 from the direct current power source may be omitted.

When the molded portion 5 of the electric motor stator 1 is formed, in a case where application of an electric current to the stator coils 3 is omitted and the thermosetting resin TR is heated only by heating the forming die 100 with the heater H, the heating time th for the thermosetting resin TR may be set as described below. In this case too, first of all, heating time is derived with the use of the characteristic curve of the thermosetting resin TR (see FIG. 3), the heating time being for the thermosetting resin TR to reach a targeted curing extent when the thermosetting resin TR is heated at given heating temperature T (for example, 150° C.) in a room temperature environment. Then, with the use of a testing device shown in FIG. 6, the shear force of the thermosetting resin TR is measured with each curing extent in the interval of 10%.

Figure 6:
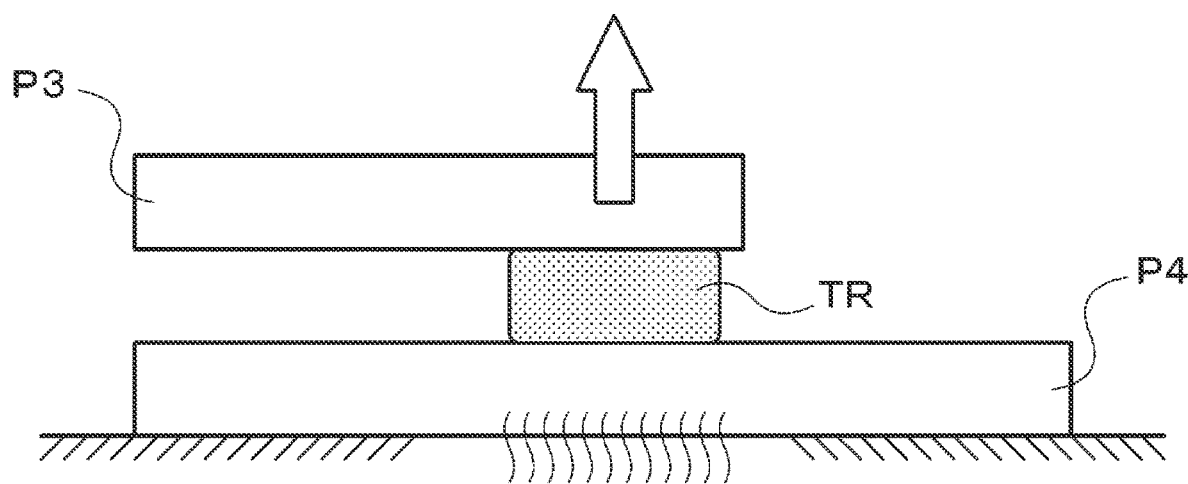
FIG. 6 is a schematic view describing steps for measuring adhesive strength of the thermosetting resin.
Figure 7:
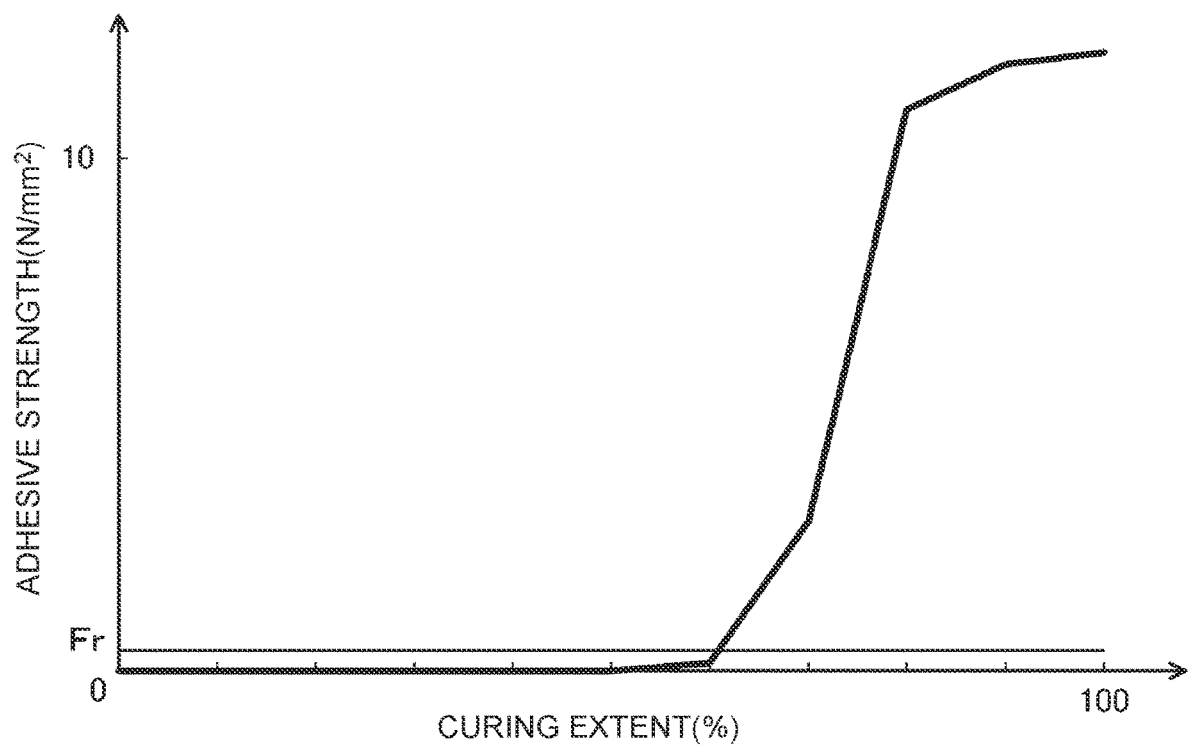
FIG. 7 is a graph showing a measurement result of the adhesive strength of the thermosetting resin.

The testing device shown in FIG. 6 includes two plates P3, P4 that are made of metal (iron) and extend in parallel to one another. The plate P4 on a lower side in the drawing is fixed so as to be stationary. When the shear force of the thermosetting resin TR is measured, the thermosetting resin TR is disposed between the two plates P3, P4. Also, a lower surface of the plate P4 on the lower side of the drawing is heated by a heater (not shown) so as to heat the thermosetting resin TR at given temperature (for example, 150° C.). Moreover, at a point when heating time corresponding to a targeted curing extent has elapsed since start of the heating, force is applied to the plate P3 on an upper side in the drawing in an upward direction, in other words, a direction orthogonal to the extending direction of the plates P3, P4. Then, as the plate P3 is separated from the plate P4, force generated when the thermosetting resin TR is separated from the plate P3 and/or the plate P4 is measured as adhesive strength between the plates P3, P4, corresponding to the coil end portions 3a, and the thermosetting resin TR. FIG. 7 shows a measurement result of the adhesive strength between the plates P3, P4 and the thermosetting resin TR per curing extent.

As shown in FIG. 7, when the curing extent of the thermosetting resin TR is 50% or lower, the adhesive strength between the plates P3, P4 and the thermosetting resin TR is substantially zero. On the contrary, when the curing extent of the thermosetting resin TR is 60%, the adhesive strength between the plates P3, P4 and the thermosetting resin TR becomes larger than zero. When the curing extent reaches 70%, the adhesive strength becomes sufficiently greater than the mold release force Fr (for example, about 0.1 N/mm$^2$) that is applied to the stator core 2 (the molded portion 5) as shown in the graph. Based on the measurement result, in the embodiment, the characteristic curve shown in FIG. 3 is used to obtain curing time when heating temperature becomes the heating temperature T and the curing extent becomes 70%, and the curing time is determined as the heating time th. In this case too, the heating time th is shortened to about 20% (for example, about three minutes) of curing time obtained from the characteristic curve shown in FIG. 3 when the curing extent of the thermosetting resin TR becomes 100%. Therefore, when the molded portion 5 of the electric motor stator 1 is formed, even if the thermosetting resin TR is not completely cured inside the forming die 100, the mold release force Fr is applied to the stator core 2 and the molded portion 5 is released from the forming die 100 with the elapse of the heating time th.

When the thermosetting resin TR is heated only by heating the forming die 100 with the heater H, the thermosetting resin TR in the periphery of the coil end portions 3a away from the inner surface of the forming die 100 is cured later than the thermosetting resin TR that is in contact with the inner surface of the forming die 100. However, as long as the adhesive strength between the coil end portions 3a and the thermosetting resin TR is greater than the mold release force Fr, the thermosetting resin TR is not separated from the coil end portion 3a theoretically even when the molded portion 5 is released from the forming die 100 with the mold release force Fr.

Therefore, at a point when the heating time th obtained as described above has elapsed since start of heating, the mold release force Fr is applied to the stator core 2, and the molded portion 5 is released from the forming die 100. Since the adhesive strength between the coil end portions 3a and the thermosetting resin TR is sufficiently greater than the mold release force Fr, it is thus possible in an extremely favorable fashion to restrain separation of the coil end portions 3a and the thermosetting resin TR from each other due to the mold release. Then, in this case too, by making the heating time th shorter than the curing time when the curing extent of the thermosetting resin TR becomes 100%, it is also possible to release the molded portion 5 from the forming die 100 at an early stage. Therefore, time required for forming the molded portion 5 can be reduced dramatically.

Further, in this case, by releasing the molded portion 5 from the forming die 100 at an early stage, the electric motor stator 1 is also separated from the forming die 100 and the thermosetting resin TR is also completely cured by remaining heat. Thus, it is not necessary to prepare a number of the forming dies 100 and a facility such as a soaking furnace for heating the integrated forming dies 100 that hold the stator cores 2 and the molded portions 5. As a result, it is possible to further reduce manufacturing cost for the electric motor stator 1 including the molded portion 5 that is made of the thermosetting resin TR and covers the coil end portions 3a of the stator coils 3. Moreover, in this case too, as the molded portion 5 is released from the forming die 100 at an early stage when the heating time th has elapsed since start of heating, the mold release force Fr becomes smaller compared to a case where the molded portion 5 is released from the forming die 100 after the thermosetting resin TR is completely cured.

Moreover, as described earlier, as heating time th of the thermosetting resin TR is previously determined from the curing extent of the thermosetting resin TR when the adhesive strength between the coil end portions 3a and the thermosetting resin TR becomes greater than the mold release force Fr, and the heating temperature T of the thermosetting resin TR, the heating time th becomes appropriate time that favorably restrains separation of the coil end portions 3a and the thermosetting resin TR. Further, it is possible to shorten the heating time th even further by more precisely specifying the curing extent when the adhesive strength between the coil end portions 3a and the thermosetting resin TR is greater than the previously-determined mold release force Fr, and heating time corresponding to the curing extent based on further experiments and analysis. When the adhesive strength is measured, a film made of the same material as that used for the segment coils 4, such as enamel resin, may be made on the plates P3, P4 shown in FIG. 6.

As described so far, with the manufacturing method for the electric motor stator 1 according to the disclosure, the molded portion 5 is rereleased from the forming die at an early stage after start of forming of the molded portion 5, and the thermosetting resin TR is cured completely by remaining heat. Therefore, it is not necessary to prepare a number of the forming dies 100 and a facility for heating the integrated forming dies 100 that hold stator the cores 2 and the molded portions 5. Hence, with the method according to the disclosure, it is possible to favorably reduce manufacturing cost of the electric motor stator 1 including the molded portion 5 that is made of the thermosetting resin TR and covers the coil end portions 3a of the stator coils 3.

The disclosed invention is not at all limited to the embodiment, and, needless to say, various changes can be made without departing from the outer limit of the scope of the invention. Further, the embodiment is only a specific aspect of the disclosure described in the section "Summary", and does not limit elements described in the section.

The disclosed invention is applicable in a field of manufacturing electric motor stators, and so on.

What is claimed is:

1. A manufacturing method for an electric motor stator, the electric motor stator including a molded portion that is made from thermosetting resin and covers a coil end portion of a stator coil wound around a stator core, the manufacturing method comprising:
   an injecting step in which the thermosetting resin is injected into a forming die;
   a dipping step in which the coil end portion is dipped into the thermosetting resin that is injected into the forming die;
   a heating step in which the thermosetting resin inside the forming die is heated so as to form the molded portion; and
   a mold release step in which the molded portion is released from the forming die when an electric current is applied to the stator coil causing at least either a shear force of the thermosetting resin or an adhesive strength between the coil end portion and the thermosetting resin to become greater than a mold release force,
   wherein the mold release force is a force required to release the molded portion from the forming die, and
   wherein the mold release step occurs before the thermosetting resin is fully cured.

2. The manufacturing method according to claim 1, wherein
   the heating step is a step in which the thermosetting resin inside the forming die is heated by applying the electric current to the stator coil; and
   the mold release step is a step in which the molded portion is released from the forming die when the shear force of the thermosetting resin becomes greater than the mold release force.

3. The manufacturing method according to claim 2, wherein
   the mold release step is a step in which the molded portion is released from the forming die when heating time of the thermosetting resin elapses after start of heating of the thermosetting resin, the heating time being previously determined based on a curing extent of the thermosetting resin when the shear force becomes greater than the mold release force, and heating temperature of the thermosetting resin.

4. The manufacturing method according to claim 1, wherein
   the heating step is a step in which the thermosetting resin is heated by applying heat to the forming die; and
   the mold release step is a step in which the molded portion is released from the forming die when the adhesive strength between the coil end portion and the thermosetting resin becomes greater than the mold release force.

5. The manufacturing method according to claim 4, wherein
   the mold release step is a step in which the molded portion is released from the forming die when heating time of the thermosetting resin elapses after start of heating of the thermosetting resin, the heating time being previously determined based on a curing extent of the thermosetting resin when the adhesive strength becomes greater than the mold release force, and heating temperature of the thermosetting resin.

* * * * *